(12) United States Patent
Kass

(10) Patent No.: US 10,764,070 B2
(45) Date of Patent: Sep. 1, 2020

(54) HIGH PRECISION TIMESTAMPS IN BLOCKCHAIN

(71) Applicant: International Business Machines Corporation, Armonk, NY (US)

(72) Inventor: Eric Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/116,979

(22) Filed: Aug. 30, 2018

(65) Prior Publication Data

US 2020/0076625 A1    Mar. 5, 2020

(51) Int. Cl.
| | |
|---|---|
| H04L 29/06 | (2006.01) |
| H04L 9/32 | (2006.01) |
| H04L 9/06 | (2006.01) |
| G06F 16/27 | (2019.01) |
| G06F 16/18 | (2019.01) |
| G06F 16/182 | (2019.01) |

(52) U.S. Cl.
CPC ........ *H04L 9/3297* (2013.01); *G06F 16/1805* (2019.01); *G06F 16/1834* (2019.01); *G06F 16/27* (2019.01); *H04L 9/0643* (2013.01); H04L 2209/38 (2013.01)

(58) Field of Classification Search
CPC .. H04L 9/3297; H04L 9/0643; H04L 2209/38
See application file for complete search history.

(56) References Cited

U.S. PATENT DOCUMENTS

| | | | | |
|---|---|---|---|---|
| 9,948,467 | B2* | 4/2018 | King | H04L 63/0853 |
| 10,102,526 | B1* | 10/2018 | Madisetti | H04L 9/3239 |
| 10,171,248 | B2* | 1/2019 | King | H04L 9/3239 |
| 10,195,513 | B2* | 2/2019 | Tran | A63B 43/004 |
| 10,313,360 | B2* | 6/2019 | Wilson | G06F 16/152 |
| 2017/0075938 | A1 | 3/2017 | Black et al. | |
| 2017/0249482 | A1 | 8/2017 | Takaai et al. | |
| 2017/0353320 | A1 | 12/2017 | Yang | |

OTHER PUBLICATIONS

A. Stavrou, "Verified Time," Computer, vol. 50, No. 3, pp. 78-82, Mar. 2017.
B. Gipp, "CryptSubmit: Introducing Securely Timestamped Manuscript Submission and Peer Review Feedback Using the Blockchain," 2017 ACM/IEEE Joint Conference on Digital Libraries (JCDL), Toronto, ON, 2017, pp. 1-4.

(Continued)

*Primary Examiner* — Hosuk Song

(57) ABSTRACT

An example operation may include one or more of receiving, by a document server, a hash of data generated by an author registered with a blockchain, sending, by the document server, the hash of the data to a timestamp authority (TSA) to be time stamped, receiving, by the document server, a timestamp reflecting when the hash of the data was received by the TSA and forwarding the timestamp to the author, receiving a combination of the hash of the data and the timestamp (time/hash) signed by the author and forwarding the time/hash to the blockchain, receiving, by the document server, the time/hash signed by the TSA, and forwarding the time/hash signed by the TSA to the blockchain.

20 Claims, 9 Drawing Sheets

(56) References Cited

OTHER PUBLICATIONS

G. Rempe, "Chainpoint—Innovations in Blockchain Timestamp Proofs." May 22, 2017 [Accessed Mar. 7, 2018] https://tierion.com/blog/chainpoint-innovations-in-blockchain-timestamp-proofs/.
P. Todd, "OpenTimestamps: Scalable, Trust-Minimized, Distributed Timestamping with Bitcoin." https://petertodd.org/2016/opentimestamps-announcement Sep 15, 2016 [Accessed Mar. 7, 2018].
S. Jones, Old Dominion University, "Trusted Timestamping of Mementos." Apr. 20, 2017. [Accessed Mar. 7, 2018] http://ws-dl.blogspolt.de/2017/2017-04-20-trusted-timestamping-of.html.
Y. Gao, "A Decentralized Trusted Timestamping Based on Blockchains." IEEJ Journal of Industry Applications, vol. 6 (2017), issue 4, pp. 252-257.

\* cited by examiner

HIGH PRECISION TIMESTAMPS IN BLOCKCHAIN

TECHNICAL FIELD

This application generally relates to blockchain technology, and more particularly, to high precision timestamps in blockchain.

BACKGROUND

In today's world, blockchains are used for wide variety of applications. A blockchain is a Cryptographic Distributed Ledger (CDL). A distributed ledger is ledger that is replicated in whole or in part to multiple computers. The CDL can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified).

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, timestamps of documents in the blockchain ledgers are established based on the timestamp indicating when the document was registered into the blockchain ledger. However, because a distributed ledger functions by having multiple parties attempt to ledger the data entry, the time lag between the time the data entry is requested to be logged and the time the data entry is indeed logged is mathematically undefined. In practice, a document may receive a timestamp hours after the original request to ledger the entry associated with this document is made. Furthermore, conventional implementations do not validate the document author and the integrity of the timestamp generated by a Time Server.

Accordingly, what is needed is an efficient and robust method for establishing precise time consensuses in blockchains.

SUMMARY

This application is directed to method for establishing precise time consensuses in blockchains. This application also provides a method for assigning a verifiable earliest trusted timestamp to a document.

According to exemplary embodiments, the system and method provide for identifying the time and date of documents origin to a high precision. The exemplary method may be applied to any "object" over which a unique hash can be generated. The exemplary method may be particularly useful for Internet of Things (IoT) data generating devices requiring timestamps (e.g., audio/video recorders, cameras, etc.) and for devices producing copyright materials, etc. This application also enhances a mechanism of assigning timestamps to documents by assigning a verifiable earliest trusted timestamp to a document.

One example embodiment may provide a method that includes one or more of the following steps: receiving, by a document server, a hash of data generated by an author registered with a blockchain, sending, by the document server, the hash of the data to a timestamp authority (TSA) to be time stamped, receiving, by the document server, a timestamp reflecting when the hash of the data was received by the TSA and forwarding the timestamp to the author, receiving, by the document server, a combination of the hash of the data and the timestamp (time/hash) signed by the author and forwarding the time/hash to the blockchain, receiving, by the document server, the time/hash signed by the TSA, and forwarding, by the document server, the time/hash signed by the TSA to the blockchain.

Another example embodiment may provide a system that includes a processor and memory, wherein the processor is configured to perform one or more of receive a hash of data generated by an author registered with a blockchain, send the hash of the data to a timestamp authority (TSA) to be time stamped, receive a timestamp that reflects when the hash of the data was received by the ISA and forward the timestamp to the author, receive a combination of the hash of the data and the timestamp (time/hash) signed by the author and forward the time/hash to the blockchain, receive the time/hash signed by the TSA, and forward the time/hash signed by the TSA to the blockchain.

A further example embodiment may provide a non-transitory computer readable medium comprising instructions, that when read by a processor, cause the processor to perform one or more of receive a hash of data generated by an author registered with a blockchain, send the hash of the data to a timestamp authority (TSA) to be time stamped, receive a timestamp that reflects when the hash of the data was received by the TSA and forward the timestamp to the author, receive a combination of the hash of the data and the timestamp (time/hash) signed by the author and forward the time/hash to the blockchain, receive the time/hash signed by the TSA, and forward the time/hash signed by the TSA to the blockchain.

DETAILED DESCRIPTION

Figure 1:
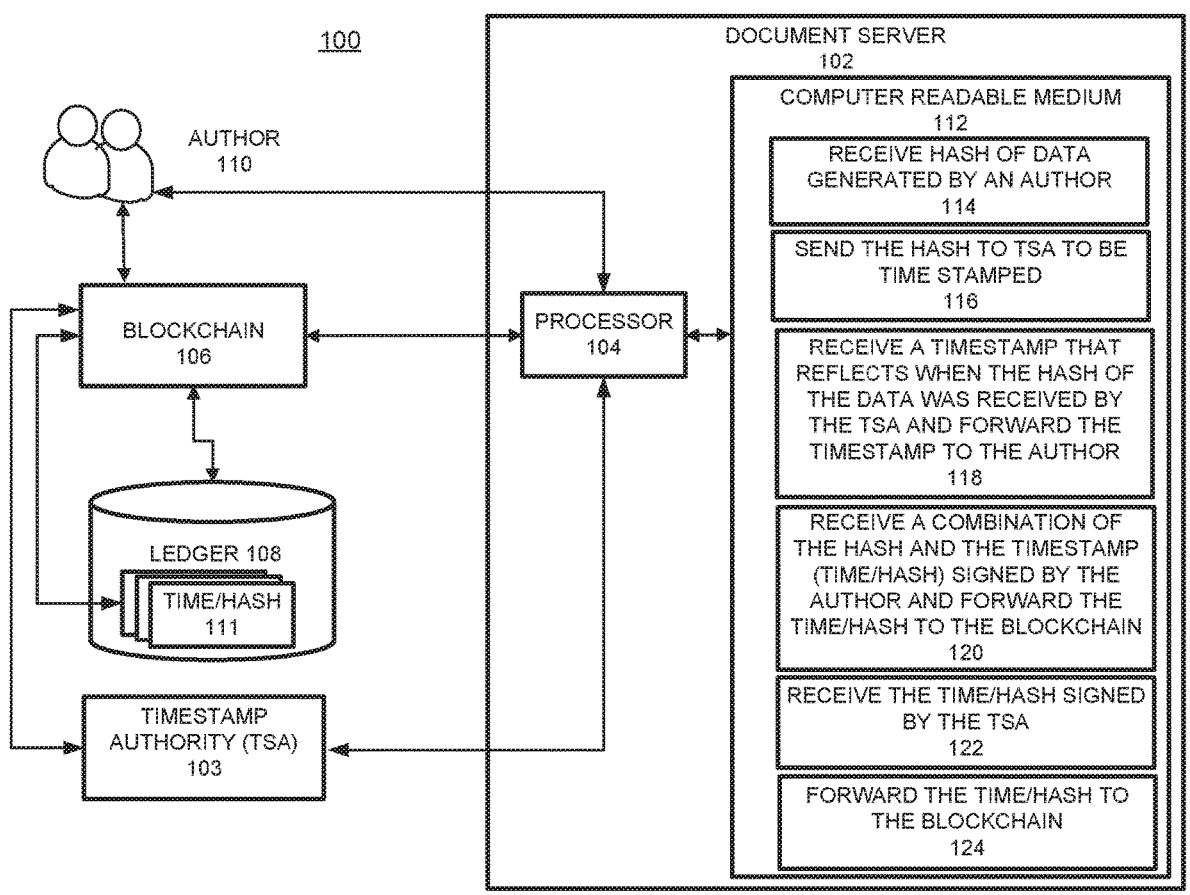
FIG. 1 illustrates a system diagram for establishing precise time consensuses in blockchains, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide for establishing precise time consensuses in blockchains. The example embodiments also provide for a mechanism for assigning a verifiable earliest trusted timestamp to a document.

The exemplary embodiments may use stored recorded transactions. A blockchain is a distributed system, which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions that are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node, which can receive client submitted transactions, commit the transactions and maintain a state and a copy of the ledger of blockchain transactions. Peers can also have the role of an endorser, although it is not a requirement. An ordering-service-node or an orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted. As discussed above, the exemplary embodiments may use recorded blockchain transactions stored on a blockchain ledger. The blockchain provides a means to register an immutable timestamp for a document by the author entering the document or its hash into the blockchain. The resolution for a timestamp is as precise as the blockchain itself (order of minutes). A trusted timestamp server may issue a timestamp for the document by attaching a timestamp and a signature. The timestamp server serves as an intermediary and communication to and from the timestamp server may be delayed. The timestamp server is not aware of the author (hash is not signed), therefore the hash could also be intercepted, manipulated, or spoofed. In the exemplary embodiments, the author signs the response from the timestamp server and posts the combination to the blockchain.

The example embodiments are directed to methods, devices, networks, non-transitory computer readable media and/or systems, which support a blockchain solution for establishing precise time consensuses in blockchains. Some of the benefits of such a solution include enabling for generation of an immutable record of a document's time of origin endorsed by three parties, a time authority, a blockchain, and the document's author. Signatures by the time authority, the author, and entry into the blockchain provide consensus of the time of origin. Accessibility of the signed records is the basis of the method by which a document's time can be proven.

The blockchain ledger data is immutable and that provides traceability and provenance with regard to document's time of origin endorsed by three parties, a time authority, a blockchain, and the document's author. Also, use of the blockchain provides security and builds trust. Signatures by the time authority, the author, and entry into the blockchain provide consensus of the time of origin. Accessibility of the signed records is the basis of the method by which a document's time can be proven.

The smart contract also manages the state of the asset to complete the life-cycle. The example blockchain is permission decentralized. Hence, each host device may have a ledger copy to access. Additionally, multiple Organizations (and peers) may be on-boarded on the blockchain network. The key Organizations may serve as endorsing peers to validate the smart contract execution results, read-set and write-set. The exemplary blockchain may be integrated with mobile applications or browser-based applications.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for end-user authentication using a blockchain is implemented due to immutable accountability, security, privacy, permitted decentralization, availability of smart contracts, endorsements and accessibility that are inherent and unique to blockchain. In particular, the blockchain ledger data is immutable and that provides an immutable record of a document's time of origin endorsed by three parties, a time authority, a blockchain, and the document's author. Also, use of the encryption in blockchain provides security and builds trust. The smart contract manages the state of the asset to complete the life-cycle. The example blockchains is permission decentralized. Thus, each end user may have its own ledger copy to access. Multiple Organizations (and peers) may be on-boarded on the blockchain network. The key Organizations may serve as endorsing peers to validate the smart contract execution results, read-set and write-set. In other words, the blockchain inherent features provide for assigning of a verifiable earliest trusted timestamp to a document.

One of the benefits of the example embodiments is an improvement of the functionality of a computing system by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a Business Network of users and on-board/off-board organizations to collaborate and execute service processes in the form of smart contracts.

Through the blockchain solution described herein, a computing system can perform novel functionality by providing an automated method for assigning a verifiable earliest trusted timestamp to a document.

The example embodiments provide numerous benefits over a traditional database. For example, various advantages are achieved by immutable accountability, security, privacy, permitted decentralization, availability of smart contracts, endorsements and accessibility that are inherent and unique to blockchain.

Meanwhile, a traditional database could not be used to implement the example embodiments, because it does not bring all parties (i.e., timestamp server and end users) on the business network, it does not create trusted collaboration and does not provide for assigning of a verifiable earliest trusted timestamp to a document.

Meanwhile, if a traditional database were to be used to implement the example embodiments, the example embodiments would have suffered from unnecessary drawbacks such as search capability, lack of security and slow speed of transactions. Additionally, the automated assignment of a verifiable earliest trusted timestamp to a document would simply not be possible.

Accordingly, the example embodiments provide for a specific solution to a problem in the arts/field of establishing precise time consensuses in blockchains. In particular, the exemplary embodiments provide for high resolution—i.e., a document timestamp is generated within second. The timestamp provided by the timestamp server may be validated by the author only after the author agrees and posts the timestamp to the blockchain ledger. According to the exemplary embodiments, the timestamp is resilient to possible timestamp server compromise (e.g., server certificate has been corrupted or tempered with). The blockchain timestamp provides for a lower resolution backup.

Additionally, the integrity of the timestamp server private key certificate need only extend to the time the document is registered in the blockchain so that if the timestamp server certificate is later compromised, the timestamp signed by the timestamp server residing in the blockchain is still valid. The timestamp is, advantageously, resilient to a blockchain compromise—i.e., the timestamp is verifiable even if after the blockchain is compromised.

FIG. 1 illustrates a system for establishing precise time consensuses in blockchains, according to example embodiments. Referring to FIG. 1, the example network 100 includes a timestamp authority (TSA) 103 connected to a blockchain 106, which has a blockchain ledger 108 for storing data hashes combined with timestamps (time/hash)

111. A document server 102 may be connected to the blockchain 106 and may be operatively connected to the TSA 103. While this example shows only one document server 102 and one TSA 103, multiple TSAs may be connected to multiple document servers connected to the blockchain 106. It should be understood that the document server 102 may include additional components and that some of the components described herein may be removed and/or modified without departing from a scope of the document server 102 disclosed herein. The document server 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the document server 102 may include multiple processors, multiple cores, or the like, without departing from a scope of the document server 102 system.

The document server 102 may also include a non-transitory computer readable medium 112 that may have stored thereon machine-readable instructions executable by the processor 104. Examples of the machine-readable instructions are shown as 114-124 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 114 to receive a hash of data. The hash is generated by an author 110 registered with a blockchain 106. The blockchain 106 may be managed by one or more devices and may be accessible by multiple authors (end users) 110 on a decentralized network. The blockchain 106 may be configured to use one or more smart contracts that specify transactions among multiple authors 110. The processor 104 may fetch, decode, and execute the machine-readable instructions 116 to send the hash of the data to a timestamp authority (TSA) 103 to be time stamped. The processor 104 may fetch, decode, and execute the machine-readable instructions 118 to receive a timestamp that reflects when the hash of the data was received by the TSA and forward the timestamp to the author. The timestamp may be sent to the author as an acknowledgement. The author 110 signs a combination of the timestamp and the hash of data (time/hash) only when he is in agreement of the timestamp. The author 110 may use a private key associated with a certificate signed by an authority and may attach (or link to) the public key certificate associated with the private key. This provides public proof that the author acknowledges the timestamp. Then, the author 110 may submit the signed time/hash to be entered into the blockchain 106. The processor 104 may fetch, decode, and execute the machine-readable instructions 120 to receive a combination of the hash of the data and the timestamp (time/hash) signed by the author 110 and to forward the time/hash to the blockchain 106. The TSA's public key certificate associated with the private key may be issued by a significantly trusted authority. A copy of the public key certificate may be stored or linked together with the signature. The processor 104 may fetch, decode, and execute the machine-readable instructions 122 to receive the time/hash signed by the TSA 103.

The processor 104 may fetch, decode, and execute the machine-readable instructions 124 to forward the time/hash signed by the TSA 103 to the blockchain 106 to be recorded for validation.

In one embodiment, the author 110 may wait for after the TSA 103 sends the signed time/hash to the blockchain 106 and may pull the timestamp residing in the blockchain 106. Then, the author 110 may verify the timestamp and may sign the combination of the timestamp and the hash (time/hash). According to one exemplary embodiment, the timestamp from the TSA 103 may be considered valid when the time/hash from the TSA 103 and the time/hash from the author 110 entries in the blockchain 106 match.

Figure 2A:
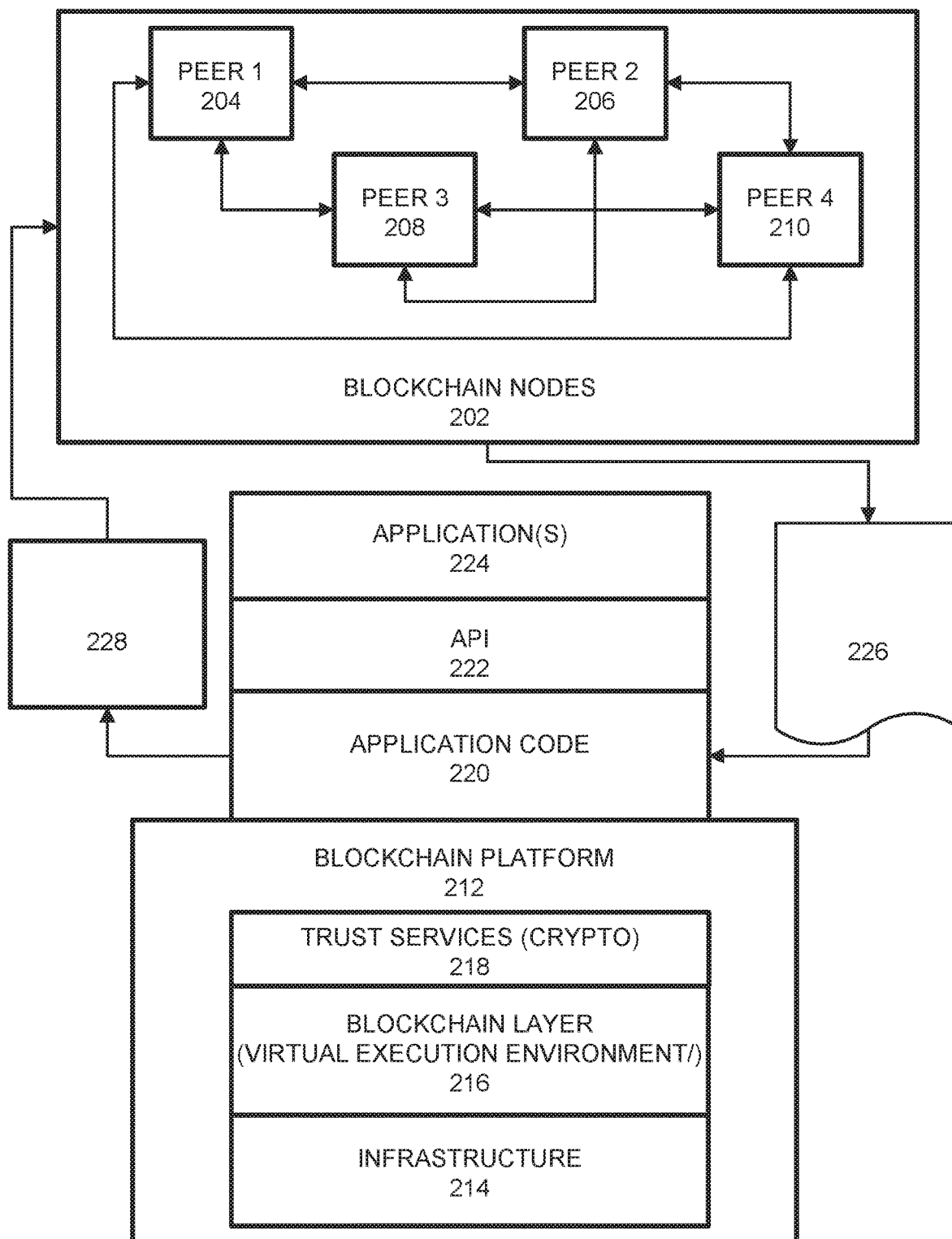
FIG. 2A illustrates an example peer node blockchain architecture configuration for implementation of a precise time consensuses, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, timestamp information 226 may be processed by one or more processing entities (e.g., virtual machines) included in the blockchain layer 216. The processed timestamp result 228 may include the time/hash signed by the TSA and by the author. The physical infrastructure 214 may be utilized to retrieve any of the data or information described herein.

Within chaincode, a smart contract may be created via a high-level application and programming language, and then written to a block in the blockchain. The smart contract may include executable code, which is registered, stored, and/or replicated with a blockchain (e.g., distributed network of blockchain peers). A transaction is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the timestamp information may be implemented as a committed blockchain transaction. One function at box 228 may be to provide the time/hash signed by the timestamp server and by the author, which may be provided to one or more of the nodes 204-210 that may host a timestamp server.

Figure 2B:
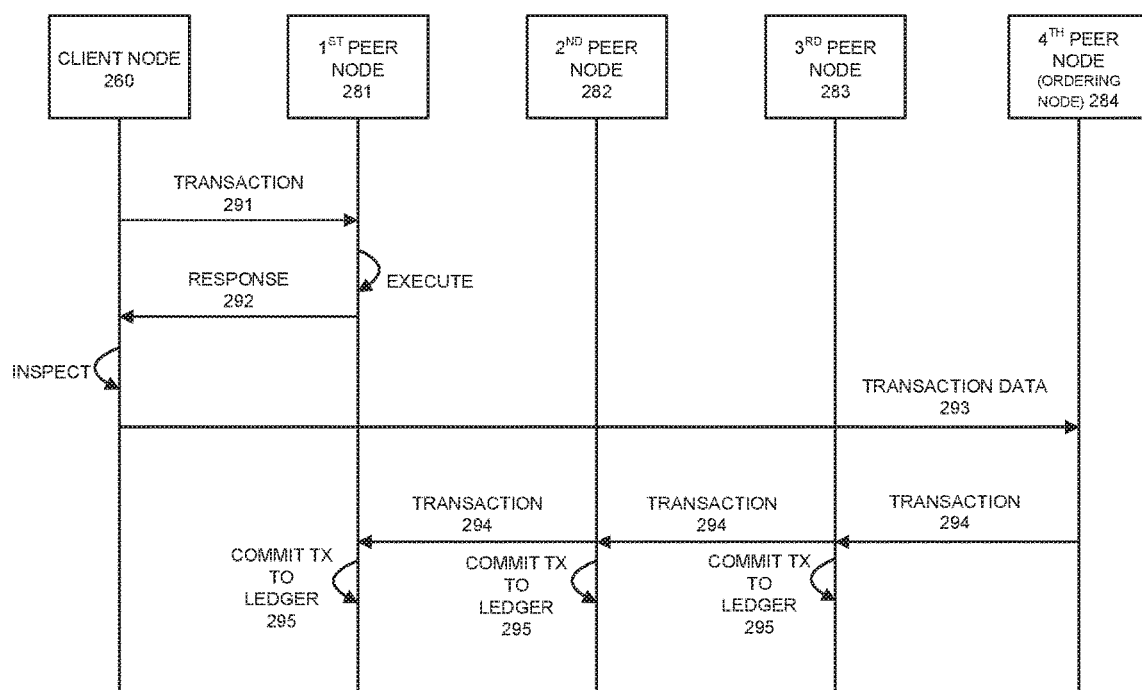
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260, which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
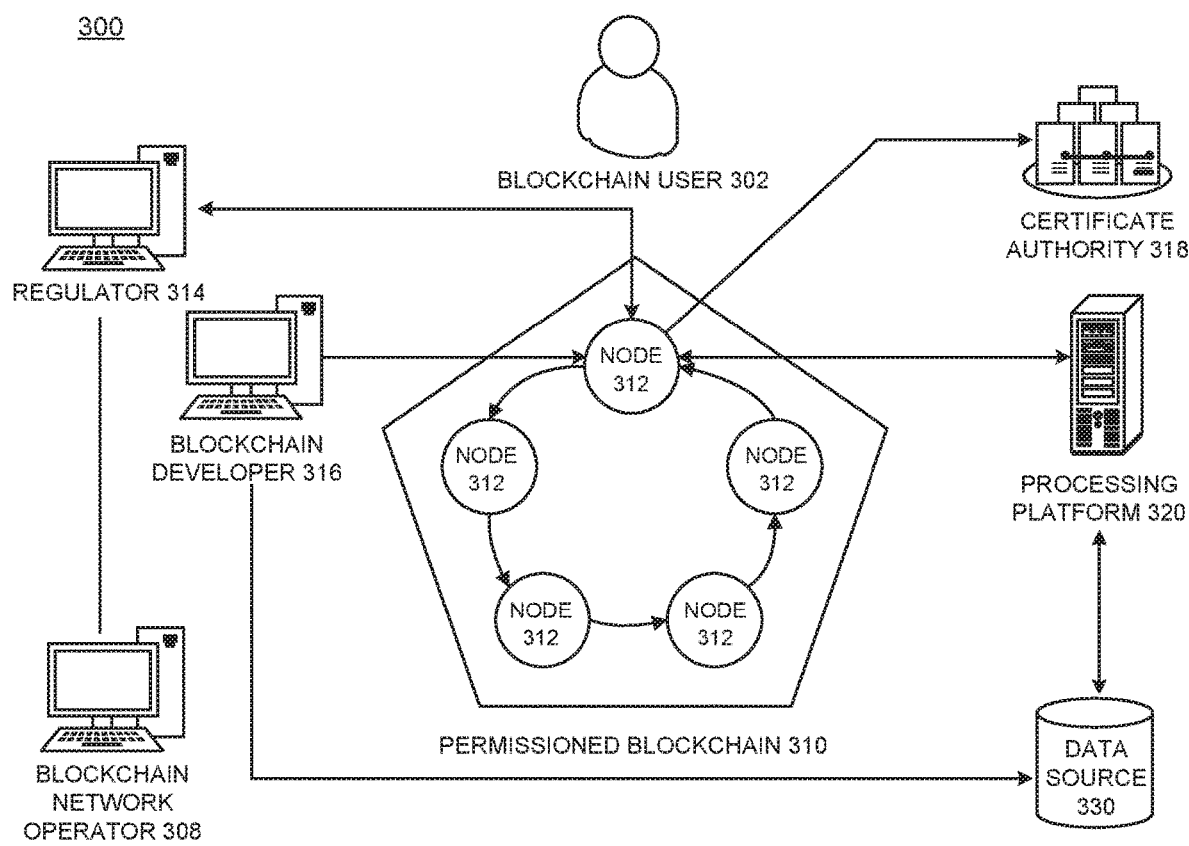
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
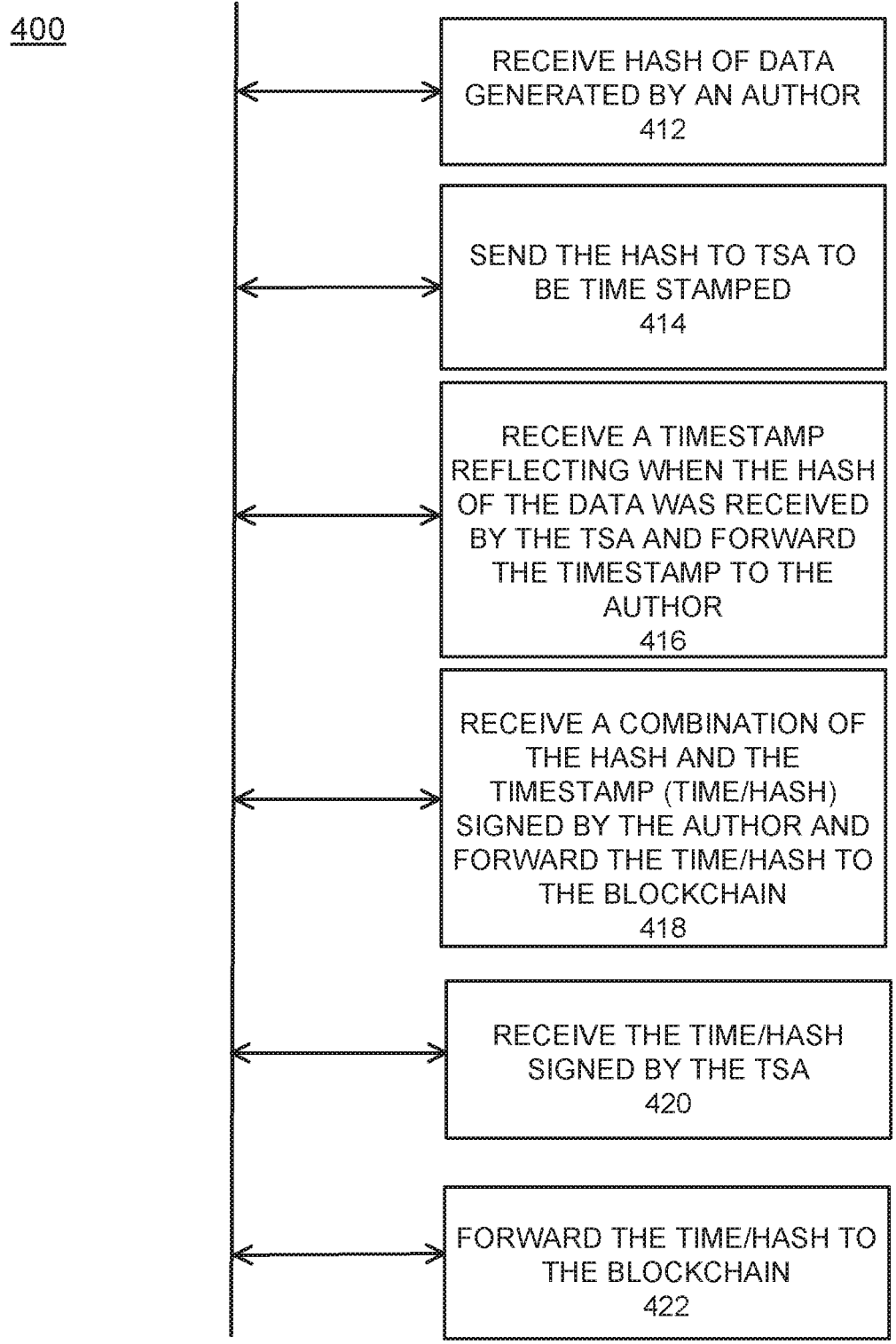
FIG. 4A illustrates a flow diagram of an example method of establishing precise time consensuses in blockchains, according to example embodiments.

FIG. 4A illustrates a flow diagram 400 of an example method of establishing precise time consensuses in blockchains, according to example embodiments. Referring to FIG. 4A, the method 400 may include one or more of the steps described below.

FIG. 4A illustrates a flow chart of an example method executed by the document server 102 (see FIG. 1). It should be understood that method 400 depicted in FIG. 4A may include additional operations and that some of the operations described therein may be removed and/or modified without departing from the scope of the method 400. The description of the method 400 is also made with reference to the features depicted in FIG. 1 for purposes of illustration. Particularly, the processor 104 of the document server 102 may execute some or all of the operations included in the method 400.

With reference to FIG. 4A, at block 412, the processor 104 may receive a hash of data. The hash is generated by an author 110 registered with a blockchain 106. At block 414, the processor 104 may send the hash of the data to a timestamp authority (TSA) 103 to be time stamped. At block 416, the processor 104 may receive a timestamp reflecting when the hash of the data was received by the TSA and forwarding the timestamp to the author 110. The timestamp is sent to the author as an acknowledgement. At block 418, the processor 104 may receive a combination of the hash of the data and the timestamp (time/hash) signed by the author 110 and the processor 104 may forward the time/hash to the blockchain 106. The author 110 may sign the time/hash only when the author 110 is in agreement with the timestamp. The author 110 may use a private key associated with a certificate signed by an authority and may attach (or link to) the public key certificate associated with the private key. This provides public proof that the author 110 acknowledges the timestamp. Then, the author 110 may submit the signed time/hash to be entered into the blockchain 106. At block 420, the processor 104 may receive the time/hash signed by the TSA 103. At block 422, the processor 104 may forward the time/hash signed by the TSA 103 to the blockchain 106.

As discussed above, the TSA's public key certificate associated with the private key may be issued by a significantly trusted authority. A copy of the public key certificate may be stored or linked together with the TSA 103 signature. In one embodiment, the author 110 may wait for after the documents server 102 sends the signed by the TSA 103 time/hash to the blockchain 106 and may pull the timestamp residing in the blockchain 106. Then, the author 110 may verify the timestamp and may sign the time/hash. As discussed above, the timestamp from the TSA 103 may be considered valid when the entries from both the TSA 103 and the author 110 in the blockchain 106 match.

Figure 4B:
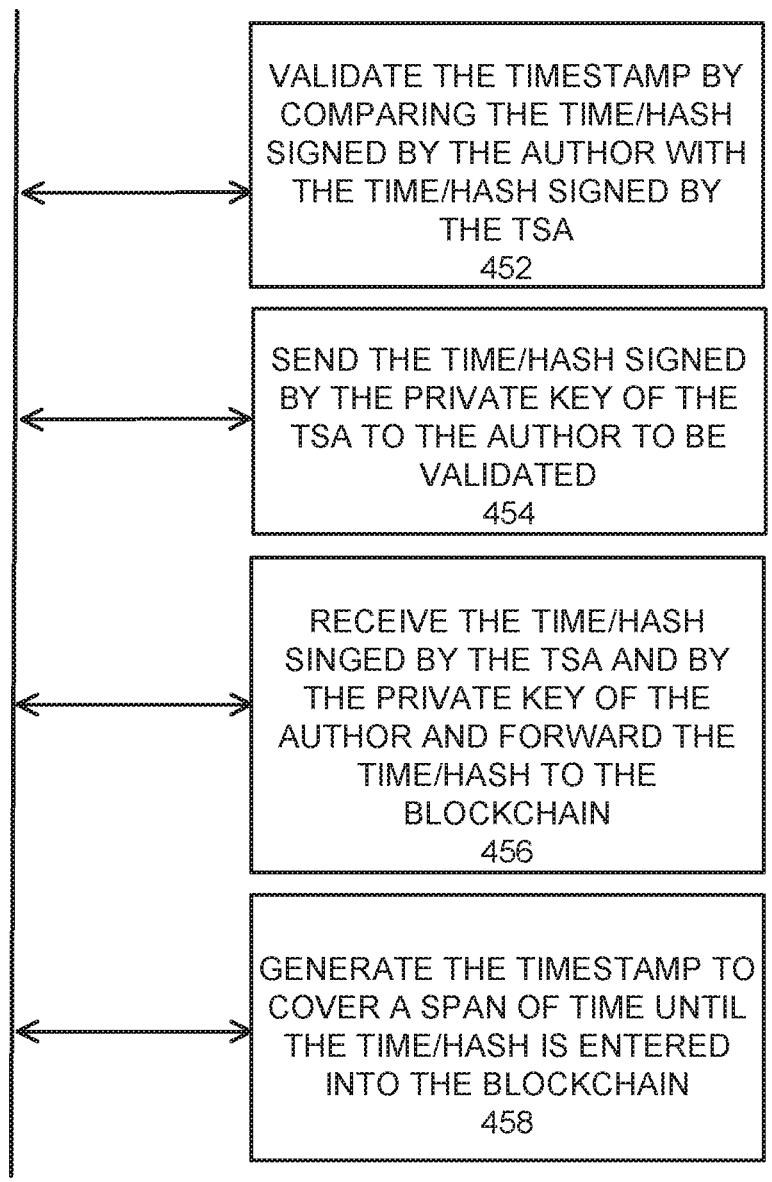
FIG. 4B illustrates a flow diagram of an example method of assigning a verifiable earliest trusted timestamp to a document, according to example embodiments.

FIG. 4B illustrates a flow diagram 450 of an example of assigning a trusted verifiable earliest timestamp to a document, according to example embodiments. Referring to FIG. 4B, the method 450 may also include one or more of the following steps. At block 452, the processor 104 may validate the timestamp by comparing the time/hash signed by the author with the time/hash signed by the TSA. At block 454, the processor 104 may send the time/hash signed by the private key of the TSA to the author to be validated. At block 456, the processor 104 may receive the time/hash signed by the TSA and by the private key of the author 110 and may forward the time/hash to the blockchain 106. At block 458, the processor 104 may generate the timestamp to cover a span of time until the time/hash is entered into the blockchain 106.

According to the exemplary embodiments, the methods described above may be particularly advantageous to mobile devices (e.g., IP cameras, IoT devices, etc), because of the author being able to delay his entry into the blockchain until high-bandwidth is available, while the timestamp server may enter a timestamp as-soon-as-possible.

According to the methods of exemplary embodiments, a document's time of origin (to a much higher precession than one provided by a blockchain structure itself) may be recorded in the blockchain while retaining the consensus property. In order to retain the property of consensus in the exemplary embodiments, two signatures must be stored in the blockchain: that of the timestamp server and that of the author agreeing to the time of the timestamp provided by the timestamp server. In one exemplary embodiment, the method may prove a "first-to-file" approach, as the timestamp is recorded as-soon-as-possible, and consensus by the author follows at a later time. In another exemplary embodiment, to the method may prove "first-to-conceive" approach, as the entry including the signatures providing consensus is stored in the blockchain for others to see (i.e., provide "accessibility") at anytime well after the document's established time.

Figure 5A:
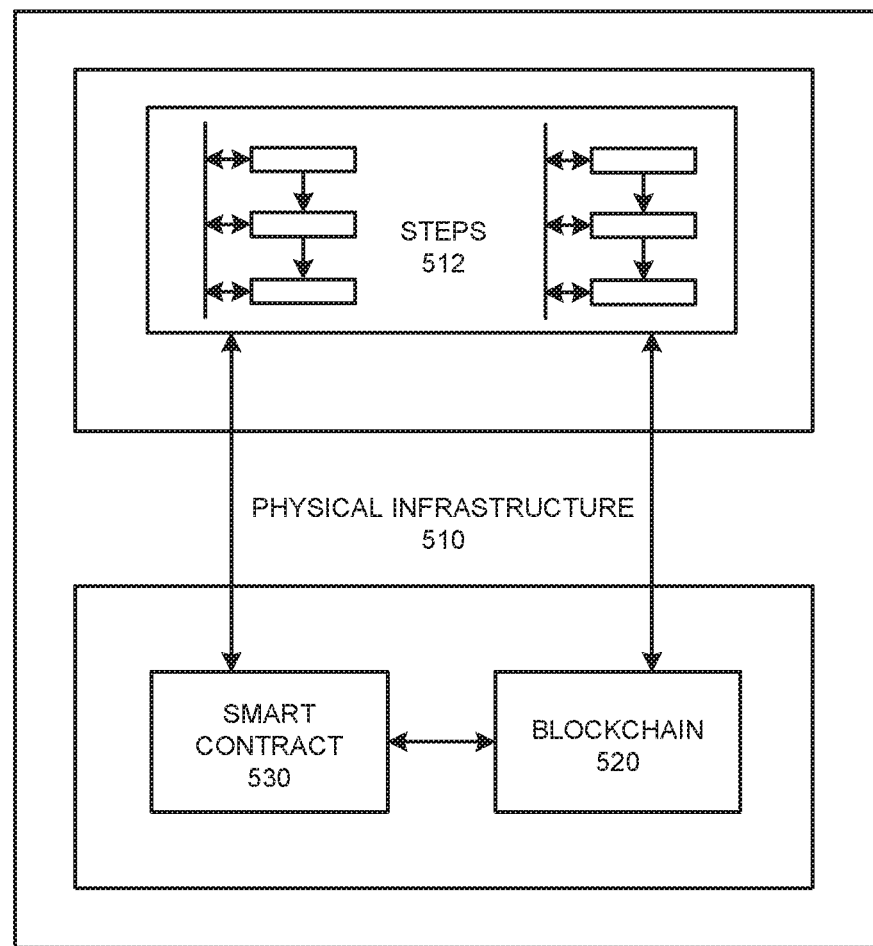
FIG. 5A illustrates an example physical infrastructure configured to perform various operations on the blockchain in accordance with one or more operations described herein, according to example embodiments.

FIG. 5A illustrates an example physical infrastructure configured to perform various operations on the blockchain in accordance with one or more of the example methods of operation according to example embodiments. Referring to FIG. 5A, the example configuration 500 includes a physical infrastructure 510 with a blockchain 520 and a smart contract 530, which may execute any of the operational steps 512 included in any of the example embodiments. The steps/operations 512 may include one or more of the steps described or depicted in one or more flow diagrams and/or logic diagrams. The steps may represent output or written information that is written or read from one or more smart contracts 530 and/or blockchains 520 that reside on the physical infrastructure 510 of a computer system configuration. The data can be output from an executed smart contract 530 and/or blockchain 520. The physical infrastructure 510 may include one or more computers, servers, processors, memories, and/or wireless communication devices.

Figure 5B:
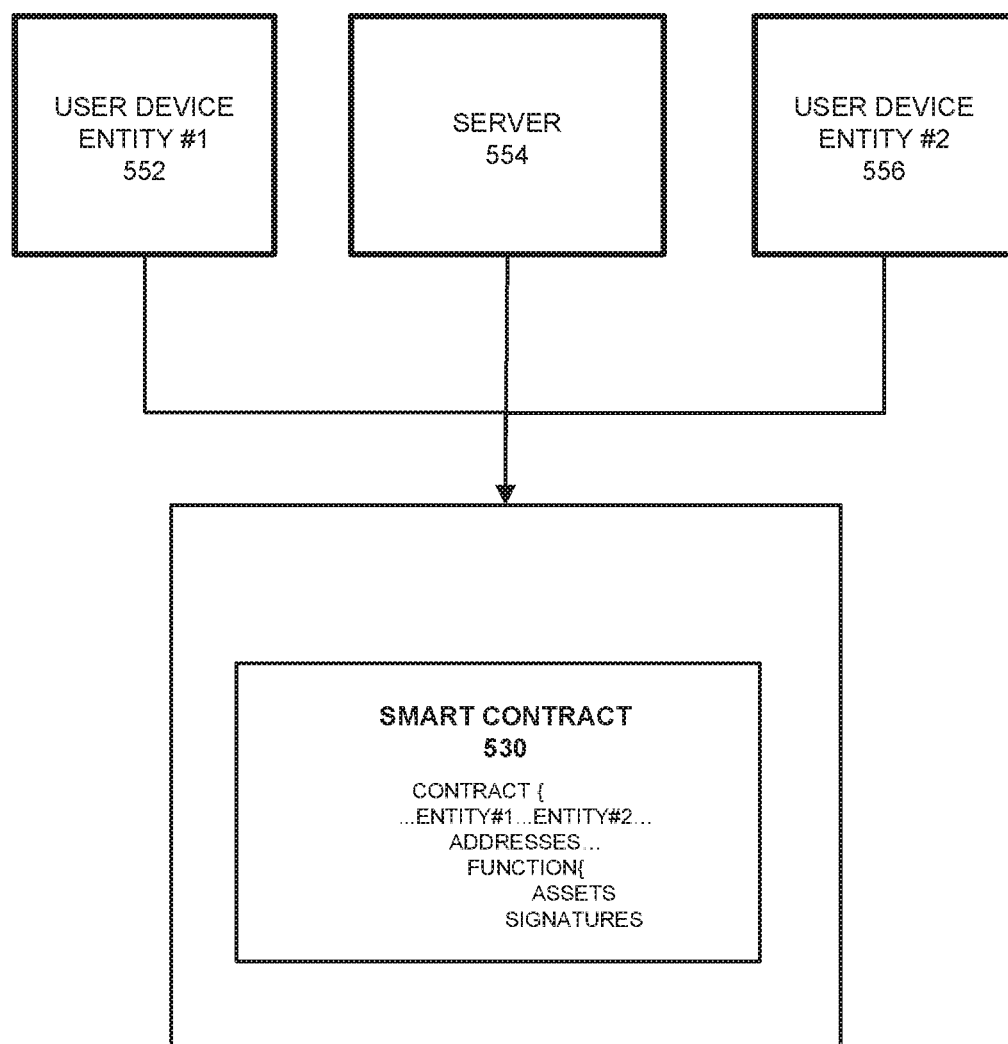
FIG. 5B illustrates an example smart contract configuration among contracting parties and a mediating server configured to enforce smart contract terms on a blockchain, according to example embodiments.

FIG. 5B illustrates an example smart contract configuration among contracting parties and a mediating server configured to enforce the smart contract terms on the blockchain according to example embodiments. Referring to FIG. 5B, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 630 may require digital signatures by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
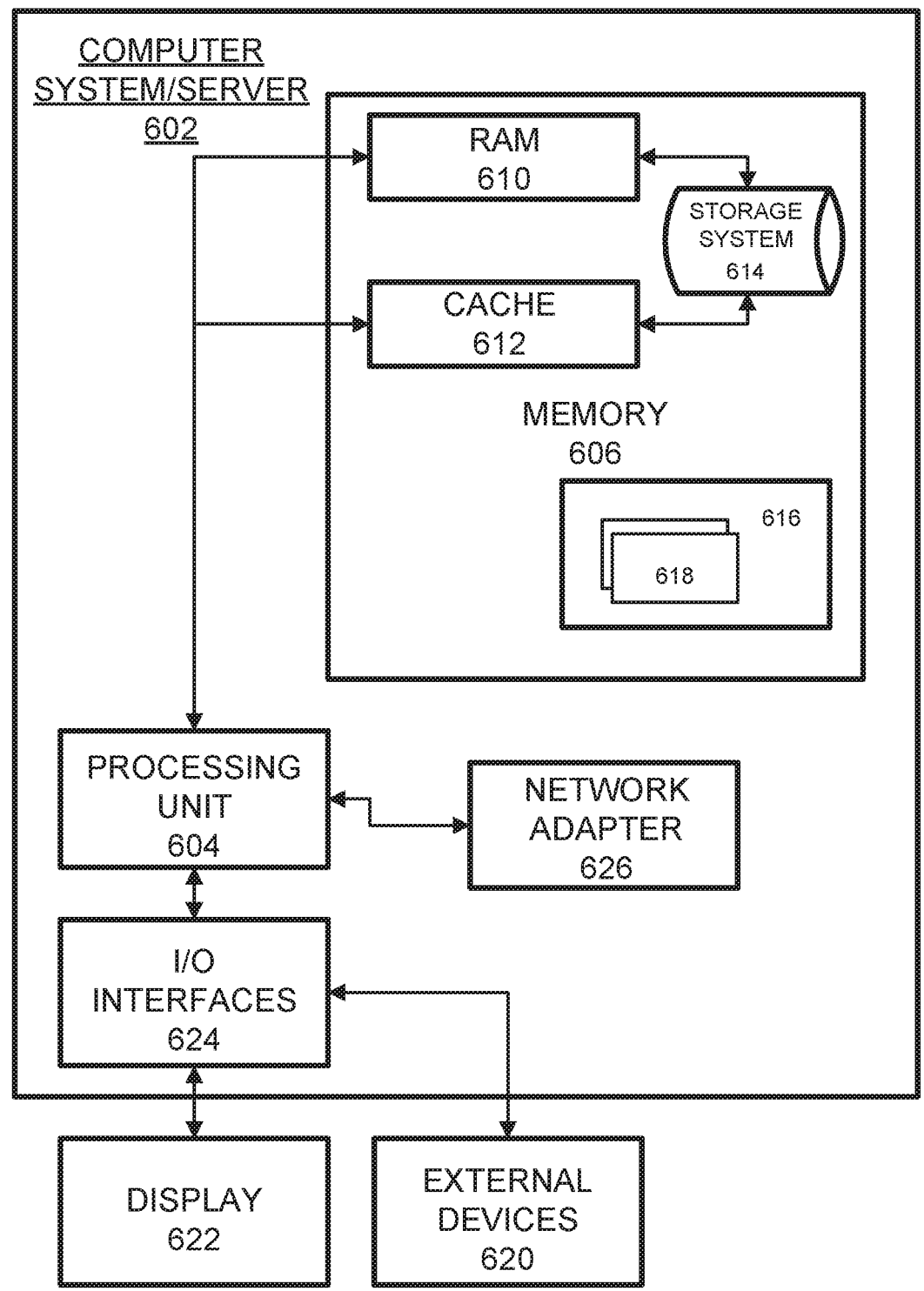
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A method, comprising:
   receiving, by a document server, a hash of data generated by an author registered with a blockchain;

sending, by the document server, the hash of the data to a timestamp authority (TSA) to be time stamped;

receiving, by the document server, a timestamp reflecting when the hash of the data was received by the TSA and forwarding the timestamp to the author;

receiving, by the document server, a combination of the hash of the data and the timestamp (time/hash) signed by the author;

forwarding, by the document server, the time/hash to the blockchain;

receiving, by the document server, the time/hash signed by the TSA; and forwarding, by the document server, the time/hash signed by the TSA to the blockchain.

2. The method of claim 1, wherein the blockchain records the time/hash signed by the author and the time/hash signed by the TSA.

3. The method of claim 1, wherein the time/hash is signed by a private key of the author associated with a certificate signed by an authority.

4. The method of claim 1, further comprising validating the timestamp by comparing the time/hash signed by the author with the time/hash signed by the TSA.

5. The method of claim 1, further comprising sending the time/hash signed by the private key of the TSA to the author to be validated.

6. The method of claim 1, further comprising receiving the time/hash signed by the TSA and by the private key of the author and forwarding the time/hash to the blockchain.

7. The method of claim 6, further comprising generating the timestamp to cover a span of time until the time/hash is entered into the blockchain.

8. A system, comprising:
a processor;
a memory on which are stored machine readable instructions that when executed by the processor, cause the processor to:
receive a hash of data generated by an author registered with a blockchain;
send the hash of the data to a timestamp authority (TSA) to be time stamped;
receive a timestamp that reflects when the hash of the data was received by the TSA and forward the timestamp to the author;
receive a combination of the hash of the data and the timestamp (time/hash) signed by the author;
forward the time/hash to the blockchain
receive the time/hash signed by the TSA; and
forward the time/hash signed by the TSA to the blockchain.

9. The system of claim 8, wherein the blockchain records the time/hash signed by the author and the time/hash signed by the TSA.

10. The system of claim 8, wherein the time/hash is signed by a private key of the author associated with a certificate signed by an authority.

11. The system of claim 8, wherein the instructions are further to cause the processor to validate the timestamp by comparison of the time/hash signed by the author with the time/hash signed by the TSA.

12. The system of claim 11, wherein the instructions are further to cause the processor to receive the time/hash signed by the TSA and by the private key of the author and forward the time/hash to the blockchain.

13. The system of claim 8, wherein the instructions are further to cause the processor to send the time/hash signed by the private key of the TSA to the author to be validated.

14. The system of claim 13, wherein the instructions are further to cause the processor to generate the timestamp to cover a span of time until the time/hash is entered into the blockchain.

15. A non-transitory computer readable medium comprising instructions, that when read by a processor, cause the processor to perform:
receiving a hash of data generated by an author registered with a blockchain;
sending the hash of the data to a timestamp authority (TSA) to be time stamped;
receiving a timestamp reflecting when the hash of the data was received by the TSA and forwarding the timestamp to the author;
receiving a combination of the hash of the data and the timestamp (time/hash) signed by the author;
forwarding the time/hash to the blockchain;
receiving the time/hash signed by the TSA; and
forwarding the time/hash signed by the TSA to the blockchain.

16. The non-transitory computer readable medium of claim 15, wherein the blockchain records the time/hash signed by the author and the time/hash signed by the TSA.

17. The non-transitory computer readable medium of claim 15, wherein the time/hash is signed by a private key of the author associated with a certificate signed by an authority.

18. The non-transitory computer readable medium of claim 17, further comprising instructions, that when read by a processor, cause the processor to validate the timestamp by comparing the time/hash signed by the author with the time/hash signed by the timestamp server.

19. The non-transitory computer readable medium of claim 15, further comprising instructions, that when read by a processor, cause the processor to send the time/hash signed by the private key of the TSA to the author to be validated.

20. The non-transitory computer readable medium of claim 19, further comprising instructions, that when read by a processor, cause the processor generate the timestamp to cover a span of time until the time/hash is entered into the blockchain.

* * * * *